(12) United States Patent
Nagata

(10) Patent No.: US 8,127,603 B2
(45) Date of Patent: Mar. 6, 2012

(54) PHYSICAL QUANTITY SENSOR

(75) Inventor: Yoichi Nagata, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 622 days.

(21) Appl. No.: 12/279,651

(22) PCT Filed: Feb. 16, 2007

(86) PCT No.: PCT/JP2007/052831
§ 371 (c)(1),
(2), (4) Date: Mar. 25, 2009

(87) PCT Pub. No.: WO2007/094448
PCT Pub. Date: Aug. 23, 2007

(65) Prior Publication Data
US 2010/0102878 A1    Apr. 29, 2010

(30) Foreign Application Priority Data
Feb. 17, 2006   (JP) .................................. 2006-40132

(51) Int. Cl.
*G01F 23/00* (2006.01)

(52) U.S. Cl. ...................... 73/290 R; 73/1.01; 73/304 R

(58) Field of Classification Search .................. 73/1.01, 73/290 R, 304 R
See application file for complete search history.

(56) References Cited

U.S. PATENT DOCUMENTS
3,444,738 A * 5/1969 Grangaard, Jr. ............ 73/304 R
(Continued)

FOREIGN PATENT DOCUMENTS
JP    61-154213 A    7/1986
(Continued)

OTHER PUBLICATIONS
International Search Report of PCT/JP2007/052831, date of mailing May 22, 2007.

*Primary Examiner* — Hezron E Williams
*Assistant Examiner* — Rodney T Frank
(74) *Attorney, Agent, or Firm* — Westerman, Hattori, Daniels & Adrian LLP

(57) ABSTRACT

A physical quantity sensor includes a sensor element that converts an externally applied physical quantity to an electrical signal; a detection circuit that amplifies and detects the output signal of this sensor element; and an adjustment circuit that adjusts the output signal from the detection circuit to a predetermined signal by applying the power supply wherein the adjustment circuit comprises an amplifier circuit that amplifies the output signal from the detection circuit and a reference amplifier circuit that has a gain that is made to correspond to the gain of the amplifier circuit. This configuration allows the gain of the amplifier circuit in the adjustment circuit to be varied according to the power supply voltage and, as a results, provides a physical quantity sensor having reliable sensor detection sensitivity and high-accuracy ratiometric characteristics.

9 Claims, 10 Drawing Sheets

U.S. PATENT DOCUMENTS 5,103,184 A * 4/1992 Kapsokavathis et al. ..... 324/672
5,621,359 A    4/1997 Evert

FOREIGN PATENT DOCUMENTS

| | | | |
|---|---|---|---|
| JP | 9-46150 A | 2/1997 |
| JP | 11-44540 A | 2/1999 |
| JP | 2004-53396 A | 2/2004 |
| JP | 2004-320553 A | 11/2004 |
| JP | 2005-80090 A | 3/2005 |
| JP | 2006-10408 A | 1/2006 |

* cited by examiner

PHYSICAL QUANTITY SENSOR

TECHNICAL FIELD

The present invention relates to a physical quantity sensor, and more particularly to the configuration of the output level conversion circuit of a physical quantity sensor.

BACKGROUND ART

Today, various types of physical quantity sensors are used. Especially, many proposals are made for the correction of the sensor output of an angular rate sensor typified by a vibratory gyroscope (gyro).

In the prior-art technology described in Patent Document 1, a technique is proposed for changing the detection sensitivity (scale factor) of a physical quantity sensor proportional to a variation in the power supply voltage at which the physical quantity sensor operates. As shown in FIG. 10, this prior-art physical quantity sensor has the configuration in which the output signal of a sensor element 1 detected by a detection circuit 2 is further amplified by an amplifier circuit 6 for output.

As the amplifier circuit 6, an inverting amplifier circuit implemented by an OP Amp 4 is used where a MOS element 7 is used as the input resistor and a resistor element 8 is used as the feedback resistor. The gate voltage of this MOS element 7 is biased by the voltage that varies according to the power supply voltage of the physical quantity sensor to allow the detection sensitivity of the physical quantity sensor to be adjusted and, especially, the detection sensitivity of the physical quantity sensor to be varied proportion to a variation in the power supply voltage.

These characteristics, known as ratiometric, are useful characteristics for digitally processing the output signal of a physical quantity sensor outside the sensor. That is, combining a physical quantity sensor having those output characteristics with a ratiometric-compatible A/D conversion circuit, whose conversion resolution varies proportional to the power supply voltage of the sensor, allows for an configuration where the A/D converted output data is not affected by a variation in the power supply voltage when a physical quantity is applied to the sensor.

Patent Document 1: Japanese Patent Laid-Open Publication No. 2004-53396 (pp. 4-6, FIG. 1)

DISCLOSURE OF THE INVENTION

Problems to be Solved by the Invention

According to the prior-art technology described in Patent Document 1, the gain of the amplifier circuit 6 is determined by the resistance ratio between the MOS element 7 and the resistor element 8. As the resistor element 8, a polysilicon resistor that can be configured on a semiconductor chip or an external resistor element may be used. However, because those elements have no electrical characteristic correlation with the MOS element 7 described above, the problem is that not only the absolute value error of the gain of the amplifier circuit becomes larger but also the gain of the amplifier circuit 6 is varied greatly by a variation in the ambient temperature. Another problem is that, because the characteristics of the resistance component of the MOS element 7 are nonlinear, the gain is varied according to the magnitude of the signal input to the amplifier circuit 6 and, as a result, the linearity of the detection sensitivity of the physical quantity sensor is degraded.

It is an object of the present invention to improve the problems described above and to provide a physical quantity sensor that has detection sensitivity more accurate than that of the prior-art technology.

Means for Solving the Problems

To achieve the above objects, the present invention provides an adjustment circuit that adjusts the signal level of the output signal of the sensor element wherein the adjustment circuit has the configuration in which the gain does not depend on the circuit element characteristics and the ambient temperature characteristics.

The amplifier circuit in the prior art described above has the configuration in which, when the output signal of the sensor element is amplified, the detection sensitivity of the physical quantity sensor is varied proportional to a variation in the power supply voltage, but a factor other than a variation in the power supply voltage sometimes varies the gain and this variation degrades the accuracy of the detection sensitivity of the physical quantity sensor.

In amplifying the output signal of a sensor element, a physical quantity sensor of the present invention uses, not the prior-art configuration in which the bias voltage of the gate voltage of the MOS element is varied according to the power supply voltage, but an adjustment circuit in which the signal level of the output signal of the sensor element is adjusted, in order to vary the detection sensitivity of the physical quantity sensor proportional to a variation in the power supply voltage. In addition to an amplifier circuit that amplifies the signal level of the output signal, this adjustment circuit has a reference amplifier circuit for setting the gain of the amplifier circuit. This reference amplifier circuit sets the gain of the reference amplifier circuit itself and sets this gain in the amplifier circuit correspondingly. Setting the gain of the amplifier circuit and the gain of the reference amplifier circuit correspondingly can suppress a variation in the gain caused by the characteristics of the circuit elements.

In addition, in setting the gain using the reference amplifier circuit, a variation factor other than a variation in the power supply voltage, such as a variation in the temperature, is removed to determine the gain based only on a variation in the power supply voltage. This method can suppress a variation in the gain caused by a factor other than a variation in the power supply voltage.

In this method, the physical quantity sensor of the present invention can suppress a variation in the gain caused by circuit element characteristics and a variation in the gain caused by a factor other than a variation in the power supply voltage, and can vary the detection sensitivity of the physical quantity sensor proportional to a variation in the power supply voltage without being affected by the characteristics such as the circuit element characteristics and the ambient temperature.

The adjustment circuit of the physical quantity sensor of the present invention has the amplifier circuit that amplifies the output signal of the sensor element, as well as the reference amplifier circuit whose gain is varied according to the power supply voltage, for correspondingly setting the gain of the amplifier circuit and the gain of the reference amplifier circuit. Setting the gains correspondingly in this way allows the gain determined by the reference amplifier circuit to be set as the gain of the amplifier circuit.

The reference amplifier circuit of the present invention removes a variation factor other than a variation in the power supply voltage, such as a voltage variation that varies according to the ambient temperature and so on, and sets the gain based only on a variation in the power supply voltage. So, the gain that is set by the reference amplifier circuit is determined only by a variation in the power supply voltage, and the effect of other variation factors is suppressed.

And, the gain of the amplifier circuit is set correspondingly to the reference amplifier circuit so that the gain ratio becomes constant. This configuration allows the gain of the amplifier circuit to be determined only by a variation in the power supply voltage, thus suppressing the effect of other variations.

In addition, this configuration can automatically adjust the gain of the amplifier circuit by adjusting the gain of the reference amplifier circuit and so can realize a physical quantity sensor capable of dynamically adjusting the sensor detection sensitivity to a desired value.

In addition, because the amplifier circuit and the reference amplifier circuit have the similar temperature characteristics for a variation in the ambient temperature, the gain of the amplifier circuit can be made to correspond to the gain of the reference amplifier circuit to vary the detection sensitivity of the physical quantity sensor proportional to a variation in the power supply voltage without being affected by the ambient temperature.

The more detailed configuration of the adjustment circuit of the present invention is that, in addition to the reference amplifier circuit described above, the adjustment circuit comprises a reference signal generation circuit that outputs two types of reference signal and a control circuit that controls the gain of the reference amplifier circuit.

The reference signal generation circuit outputs a first reference signal that does not depend on the power supply voltage but is constant and a second reference signal that varies according to the power supply voltage.

The reference amplifier circuit amplifies the received first reference signal and outputs the amplified signal. The control circuit controls the gain of the reference amplifier circuit so that the output of the reference amplifier circuit becomes equal to the second reference signal. An example of the control operation of the control circuit is a feedback control in which the gain of the reference amplifier circuit is decreased when the output of the reference amplifier circuit is higher than the second reference signal and the gain of the reference amplifier circuit is increased when the output of the reference amplifier circuit is lower than the second reference signal. By performing this operation, the gain, which varies according to a voltage variation in the power supply voltage, can be acquired.

The gain of the amplifier circuit is set so that the gain corresponds to the gain of the reference amplifier circuit and the gain ratio becomes constant. So, controlling the gain of this reference amplifier circuit according to the power supply voltage allows the gain of the amplifier circuit to be controlled also according to the power supply voltage.

This configuration can realize highly accurate ratiometric characteristics that the detection sensitivity of the physical quantity sensor is proportional to the voltage of the power supply.

In addition, the amplifier circuit and the reference amplifier circuit may have the same configuration. This configuration can implement a high-accuracy physical quantity sensor with the fabrication error of the adjustment circuit minimized.

The present invention provides a driving circuit that drives the sensor element and controls the driving level, at which this driving circuit drives the sensor element, in the same direction as that of the voltage variation generated in the reference signal generation circuit. This control cancels the effect caused by the voltage variation generated in the reference signal generation circuit and increases the accuracy of the output signal. To control the driving level of the sensor element in the same direction as that of the voltage variation generated in the reference signal generation circuit, the driving level of the sensor element is determined based on the first reference signal output by the reference signal generation circuit. The first reference signal output by the reference signal generation circuit does not depend on the power supply voltage and is constant but, actually, its voltage is slightly varied by a variation in the power supply voltage or by a variation in the ambient temperature. In this case, by creating the opposite increase/decrease direction relation between the output signal of the sensor element and the gain of the amplifier circuit, the effect of the voltage variation is canceled and the detection level of the physical quantity sensor is made constant.

The opposite increase/decrease direction relation between the output signal of the sensor element and the gain of the amplifier circuit can be obtained by controlling the gain of the control circuit of the present invention described above. For example, when the driving level is increased by a voltage variation, the detection signal is increased by the increase in this driving level. On the other hand, because an increase in the voltage variation of the first reference signal decreases the gain of the amplifier circuit and the gain of the reference amplifier circuit, the gain of the increased detection signal is decreased and the detection sensitivity of the physical quantity sensor obtained from the adjustment circuit becomes constant.

One or both of the amplifier circuit and the reference amplifier circuit can be implemented in multiple forms.

A first form of the amplifier circuit or the reference amplifier circuit is that an inverting amplifier or a non-inverting amplifier is configured by an operational amplifier (OP Amp) and that a resistor element connected to this operational amplifier is configured by an equivalent resistor that makes the resistance value variable using an OTA (operational transconductance amplifier: voltage-current conversion circuit). This resistor connected to the operational amplifier is configured by an equivalent resistor including a transconductance amplifier whose mutual transconductance is variable, the mutual conductance of this transconductance amplifier is controlled by the output signal of the control circuit to make the resistance variable, and the gain is controlled by making this resistance variable. The inverting amplifier or the non-inverting amplifier can be formed by appropriately connecting the input resistor or the feedback resistor to the operational amplifier.

Because the first form using this OTA can be operated so that the transconductance amplifier provides a good linearity, the detection sensitivity of the physical quantity sensor can be output with a high linearity. This form is also suitable for processing AC signals output from the sensor element before the detection.

A second form of the amplifier circuit or the reference amplifier circuit is that an inverting amplifier or a non-inverting amplifier is configured by an operational amplifier (OP Amp) and that a resistor element such as an input resistor or a feedback resistor connected to this operational amplifier is configured by an equivalent resistor that makes the resistance value variable using a switched capacitor circuit.

The input resistor or the feedback resistor or both the input resistor and the feedback resistor of this operational amplifier are configured by a switched capacitor circuit, the switching frequency of the switch on/off of this switched capacitor circuit is controlled by the output signal of the control circuit to make the resistance variable, and the gain is controlled by making the resistance variable in this way.

In this form, the feedback signal is input from the control circuit to the linear VCO (voltage controlled oscillator), and the linear VCO outputs the clock signal of frequency f corresponding to the voltage of the feedback signal. The switched capacitor circuit opens or closes the switch based on this clock signal of frequency f to make the resistance variable.

In addition, the function of a low-pass filter can be added by arranging the feedback resistor in parallel with a capacitor.

According to the second form in which this switched capacitor circuit is used, an amplifier circuit that has good linearity and a small output offset can be configured. In addition, this amplifier circuit is suitable for signal processing of detected, smoothed DC signals.

A third form of the amplifier circuit or the reference amplifier circuit is a form in which an OTA is used. In this form, a current-voltage conversion circuit is connected in series with a voltage-current conversion circuit, this voltage-current conversion circuit is configured by a transconductance amplifier whose mutual conductance is variable, the mutual conductance of this transconductance amplifier is controlled by the output signal of the control circuit to make the voltage-to-current conversion rate variable, and the current, converted by this voltage-current conversion circuit, is converted to a voltage by the current-voltage conversion circuit to control the gain.

In addition, the connection order of the adjustment circuit and the detection circuit of the present invention is that the adjustment circuit may be arranged in the front stage or back stage of the detection circuit.

In a first arrangement form in which the detection circuit is connected between the sensor element and the adjustment circuit, the detection signal of the sensor element is converted to the DC signal by the detection circuit and the adjustment circuit adjusts the signal level of this DC output.

In a second arrangement form in which the detection circuit is connected in the downstream side of the adjustment circuit, the adjustment circuit adjusts the signal level of the AC output of the sensor element. The detection circuit converts the output signal, whose level is adjusted by the adjustment circuit, to the DC signal and outputs the converted signal.

Effect of the Invention

The present invention can provide a physical quantity sensor that can vary the gain of the amplifier circuit provided in the adjustment circuit according to the power supply voltage and that has reliable sensor detection sensitivity and high-accuracy ratiometric characteristics.

DESCRIPTION OF SYMBOLS

Figure 1A:
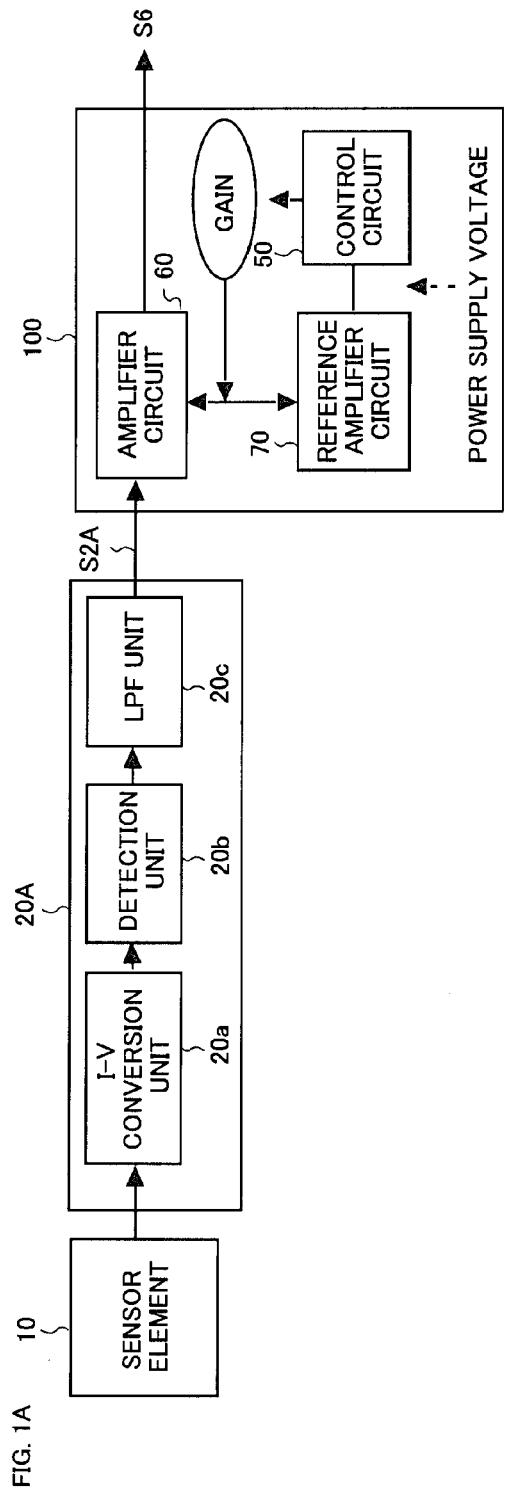
FIG. 1 is a block diagram showing the general configuration of a physical quantity sensor of the present invention.

10 Sensor element
11 Driving unit
12 Detection unit
20A,20B Detection circuit
20$a$ I-V conversion unit
20$b$ Detection unit
20$c$ LPF unit
30 Reference signal generation circuit
31 Reference voltage source
32 Reference resistor
40 I-V conversion unit
45 LPF circuit
50 Control circuit
60,60A-60D Amplifier circuit
61 OP Amp
62 Feedback resistor
63 Current-voltage conversion circuit
64 Voltage-current conversion circuit
65 Linear VCO
66 Switched capacitor circuit
66$c$ Capacitor
67 Capacitor
68 Input resistor
69 Transconductance amplifier
70 Reference amplifier circuit
80 Driving circuit
90 Mid-point voltage generation circuit
100 Adjustment circuit
S1 Sensor element output
S2A,S2B Detection output
S31 First reference signal
S32 Second reference signal
S5 Control signal
S6 Sensor output
Vdd Power supply voltage
Vm Mid-point voltage

BEST MODE FOR CARRYING OUT THE INVENTION

Figure 1B:
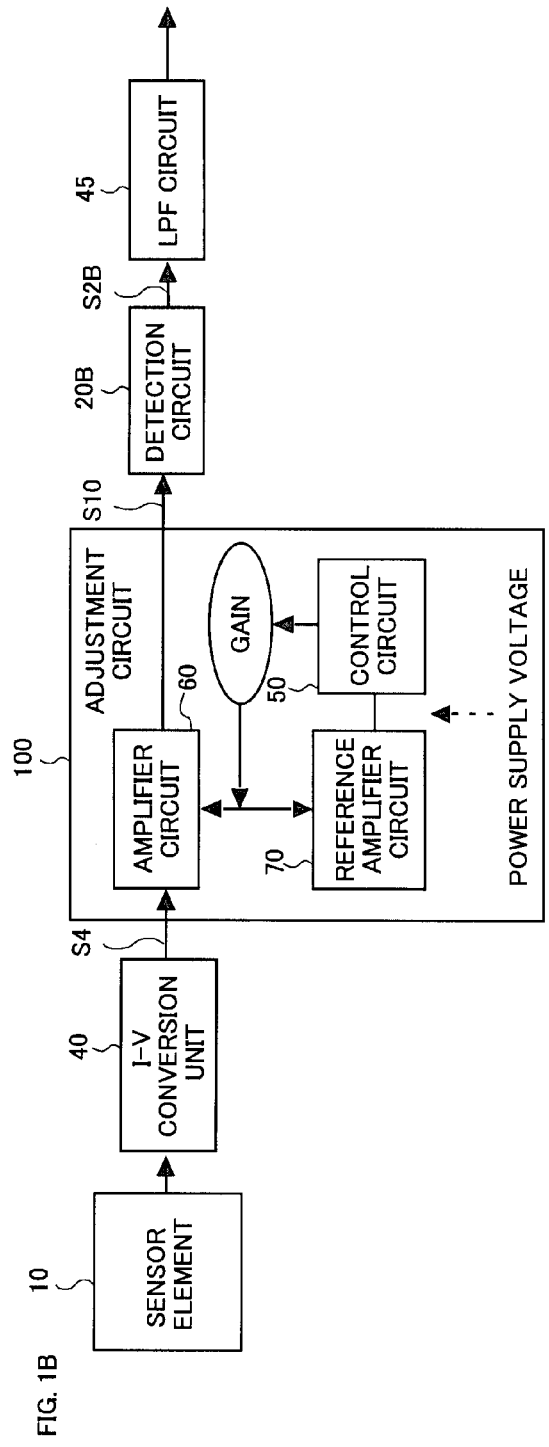
Figure 2:
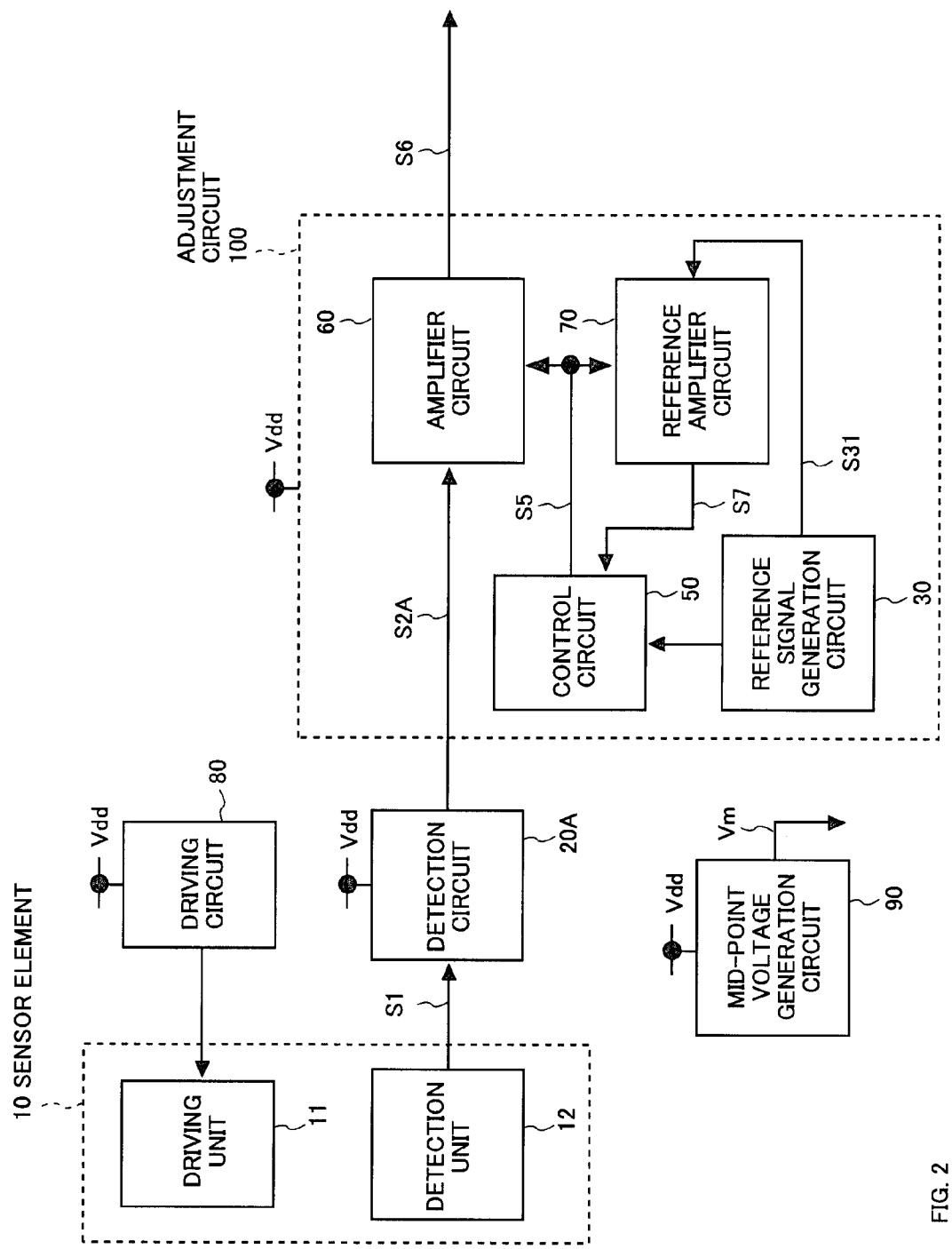
FIG. 2 is a block diagram showing the configuration form of the physical quantity sensor of the present invention.
Figure 3:
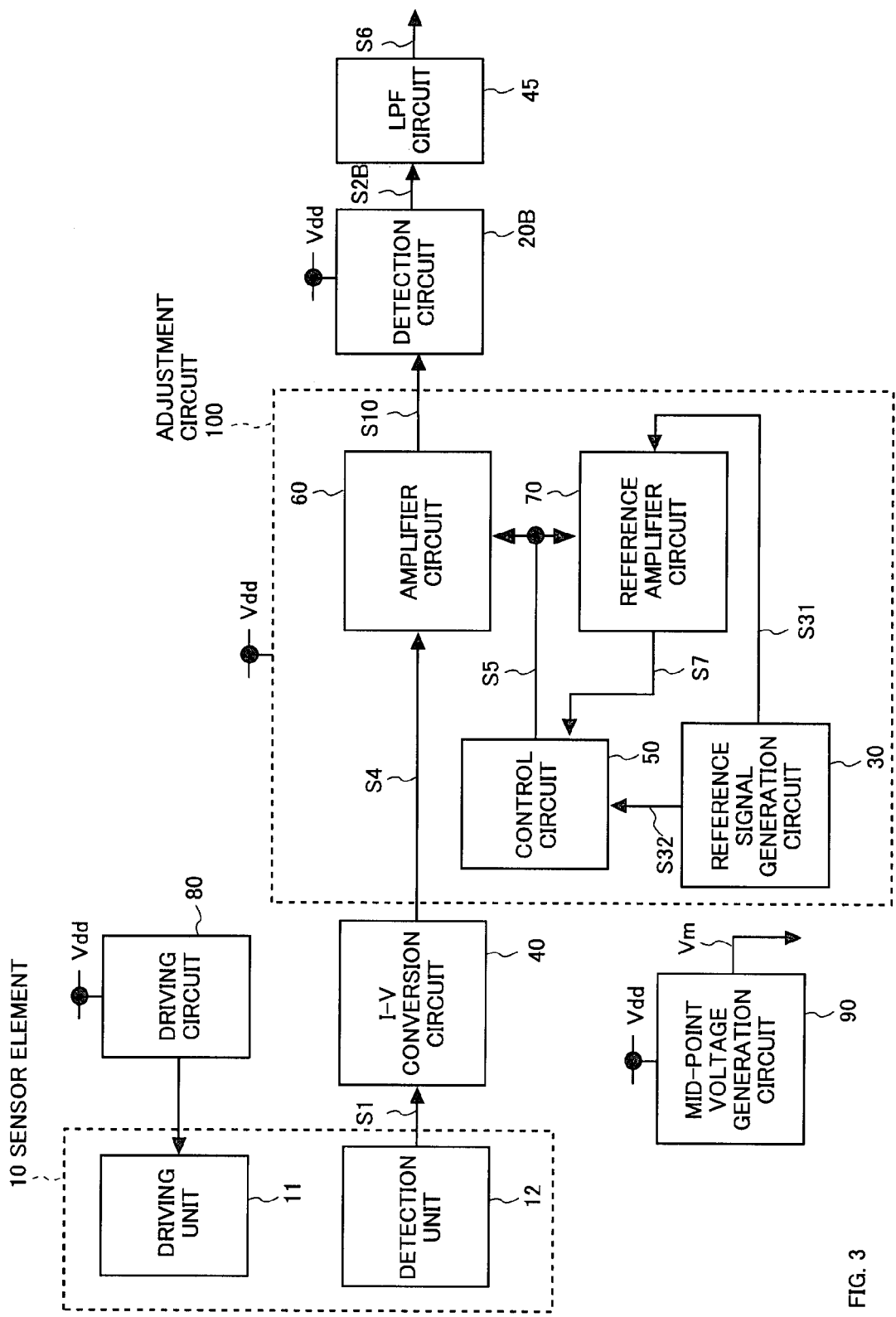
FIG. 3 is a block diagram showing the configuration form of the physical quantity sensor of the present invention.
Figure 4:
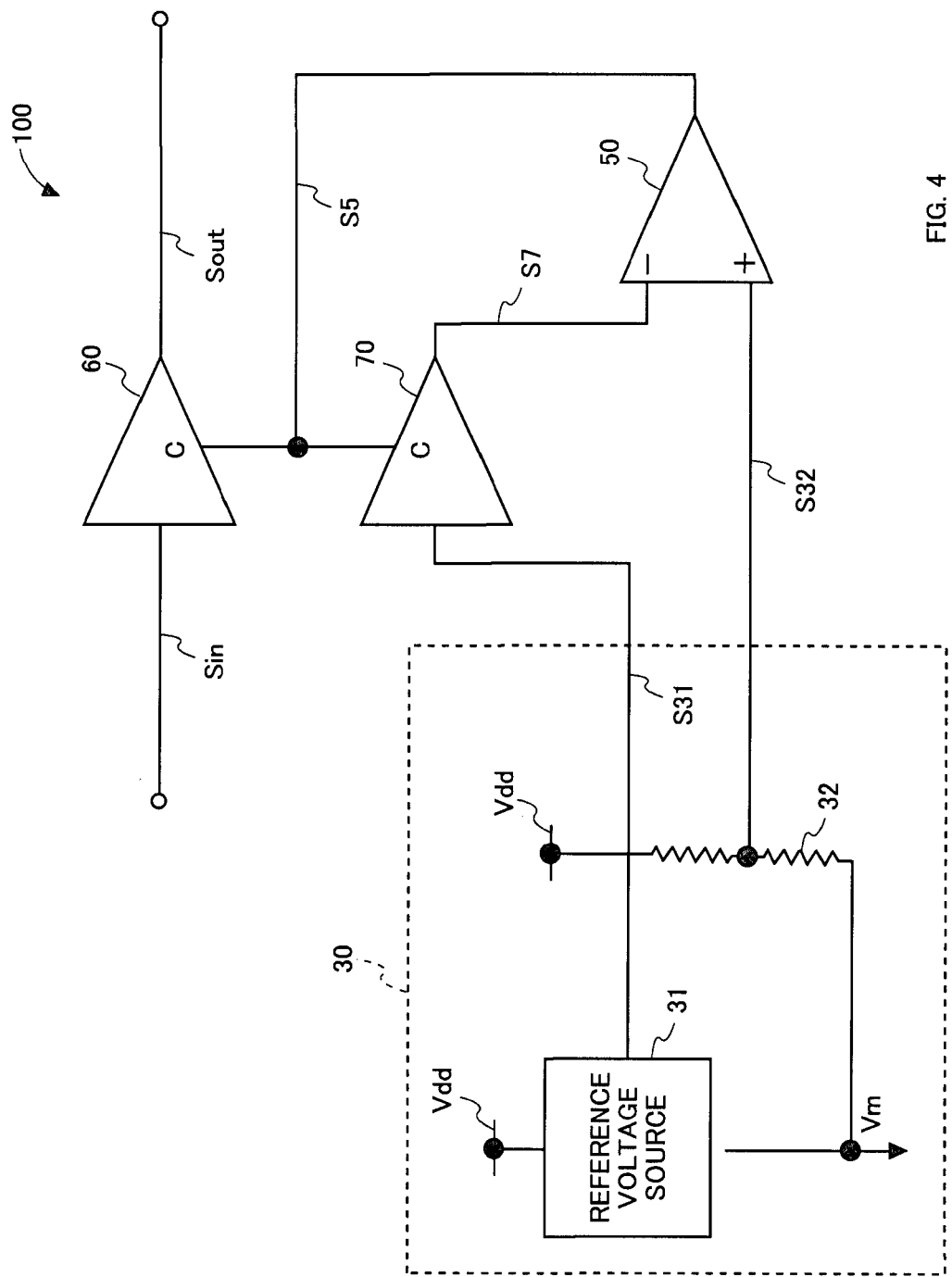
FIG. 4 is a block diagram showing the general configuration of an adjustment circuit of the present invention.
Figure 7:
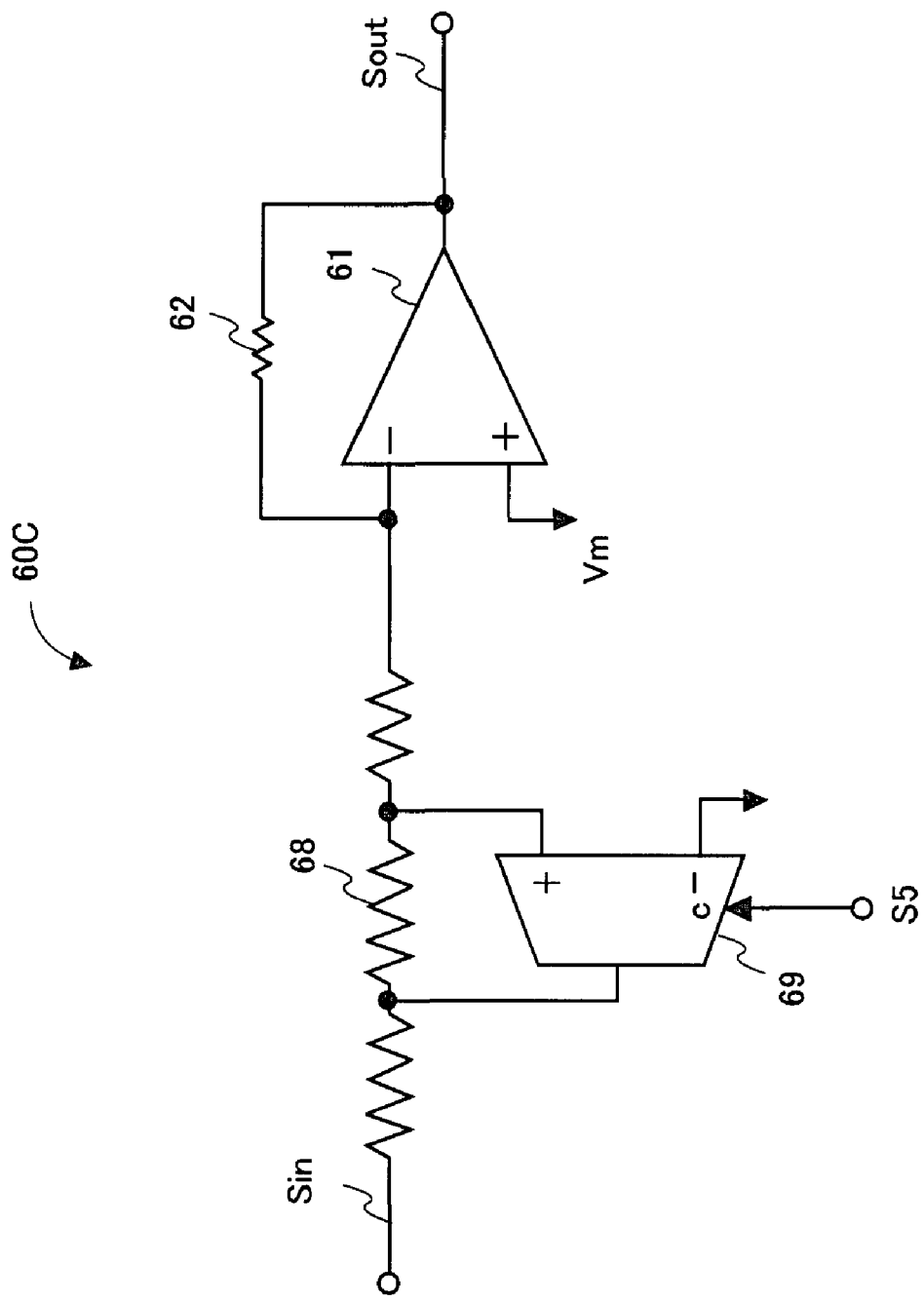
FIG. 7 is a block diagram showing the general configuration of an amplifier circuit or a reference amplifier circuit of the present invention.
Figure 8:
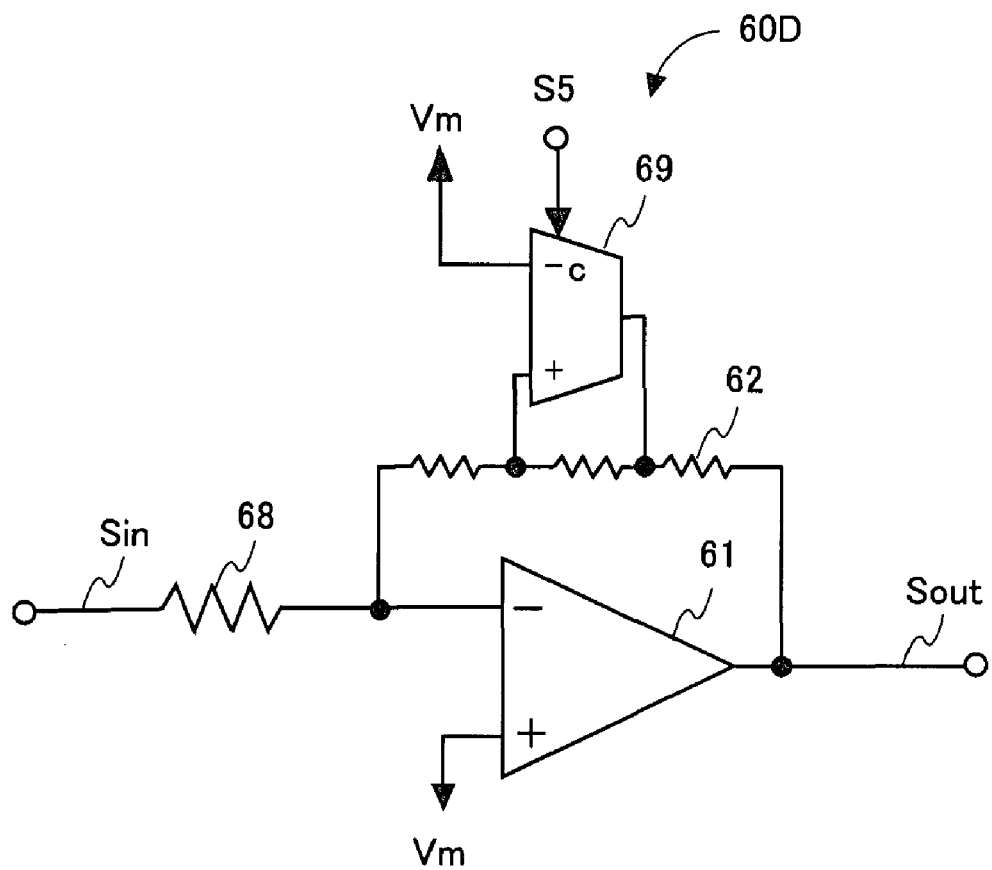
FIG. 8 is a block diagram showing the general configuration of an amplifier circuit or a reference amplifier circuit of the present invention.
Figure 9:
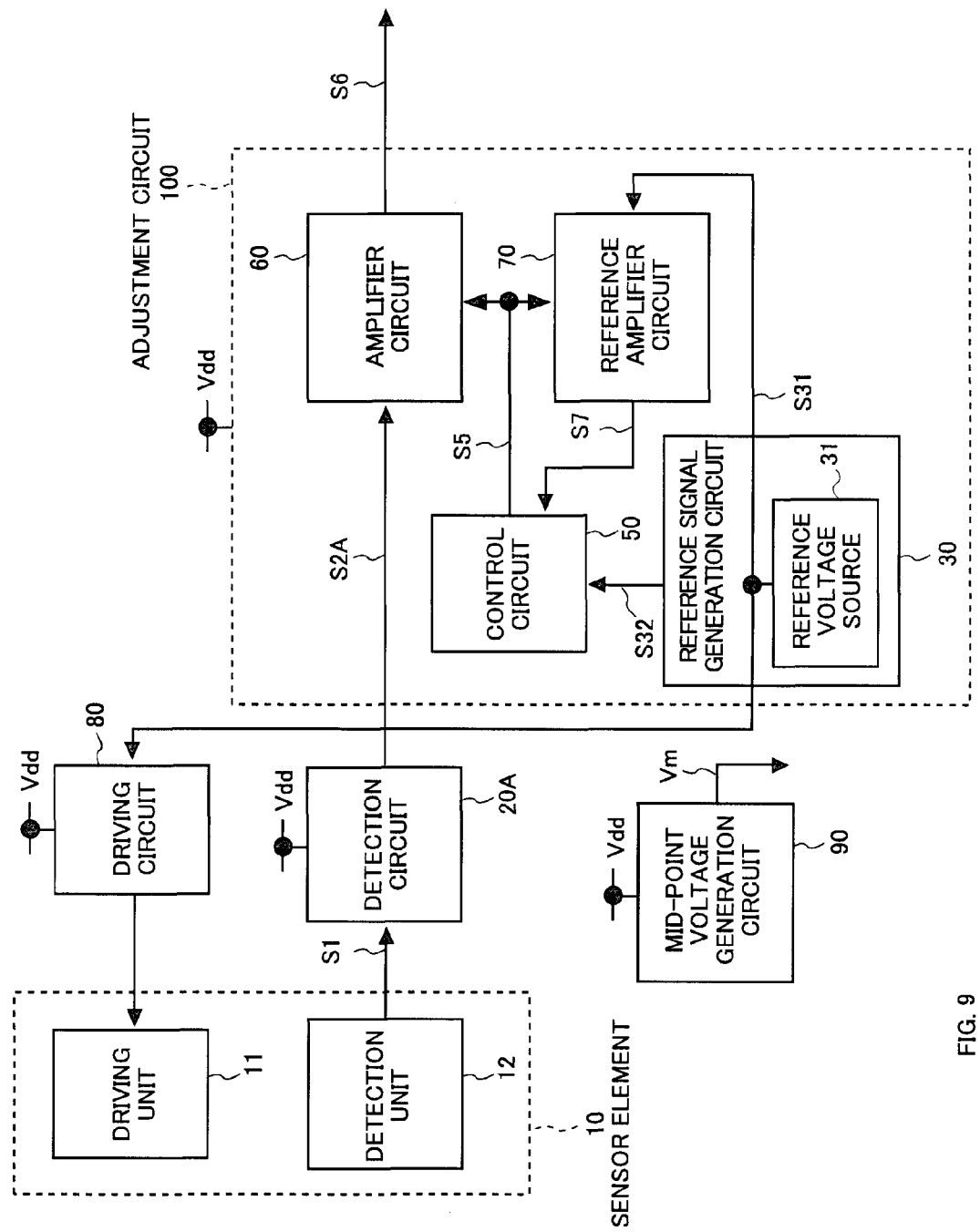
FIG. 9 is a block diagram showing the driving form of a sensor element of the present invention.
Figure 10:
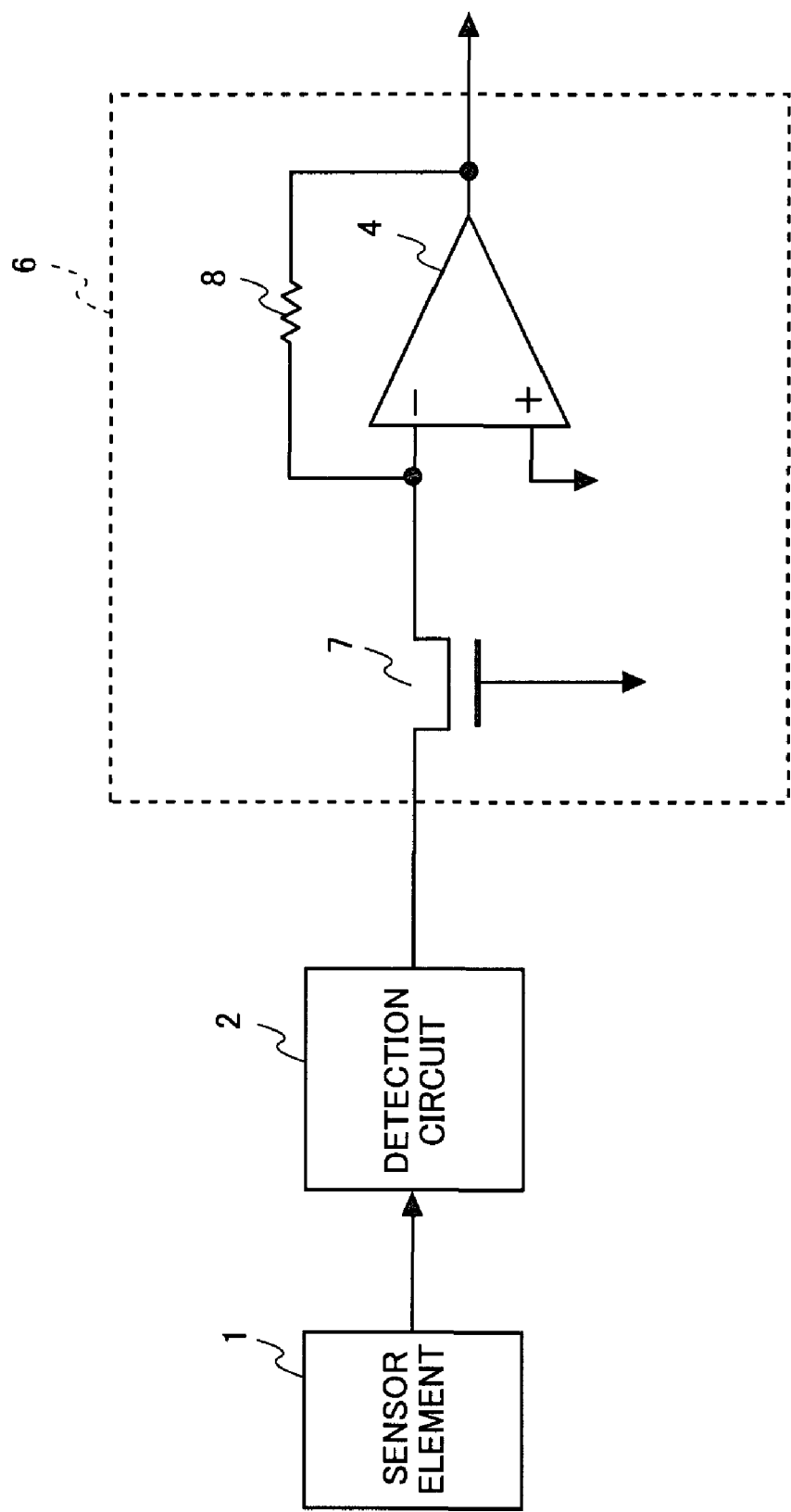
FIG. 10 is a circuit diagram showing a physical quantity sensor in the prior art.

The following describes the general configuration of the present invention with reference to FIGS. 1-3, the general configuration of an adjustment circuit of the present invention with reference to FIG. 4, the general configuration of an amplifier circuit or a reference amplifier circuit of the present invention with reference to FIGS. 5-8, and the driving form of a sensor element of the present invention with reference to FIG. 9.

First, the following describes the overall configuration of a physical quantity sensor of the present invention with reference to FIG. 1 to FIG. 3. FIG. 1 is a block diagram showing the overall configuration of the physical quantity sensor of the present invention, and FIG. 2 and FIG. 3 are block diagrams showing the configuration form of the physical quantity sensor.

The physical quantity sensor of the present invention comprises a sensor element 10, an adjustment circuit 100 that adjusts the output level of the detection signal of the sensor element 10 and varies the detection sensitivity of the physical quantity sensor proportional to a variation in the power supply voltage at which the physical quantity sensor operates, and a detection circuit 20 that detects the AC signal and outputs the DC signal. In this configuration, there are two connection forms according to the order in which the adjustment circuit 100 and the detection circuit 20 are connected: a first connection form in which the sensor element 10, detection circuit 20A, and adjustment circuit 100 are connected in this order and a second connection form in which the sensor element 10, adjustment circuit 100, and detection circuit 20B are connected in this order.

FIG. 1A is a diagram showing the first connection form, and FIG. 1B is a diagram showing the second connection form.

The physical quantity sensor in FIG. 1A comprises the sensor element 10, detection circuit 20A, and adjustment circuit 100 that are connected in this order. The detection circuit 20A includes an I-V conversion unit 20a that converts the current of the detection signal of the sensor element 10 to the voltage, a detection unit 20b that detects the voltage signal converted by the I-V conversion unit 20a, and an LPF (low-pass filter) unit 20c that converts the detection signal, generated by detecting the necessary signal component via the detection unit 20b, to the DC current. This detection circuit 20A outputs the output signal generated by converting the detection signal of the sensor element 10 to the DC signal.

Because the DC signal is output from the detection circuit 20A in the configuration shown in FIG. 1A, the adjustment circuit 100 can be configured by an analog circuit that processes the DC signal.

On the other hand, the physical quantity sensor in FIG. 1B comprises the sensor element 10, adjustment circuit 100, and detection circuit 20B that are connected in this order. An I-V conversion unit 40 is connected between the sensor element 10 and the adjustment circuit 100, and the detection circuit 20B and an LPF circuit 45 are connected in the downstream side of the adjustment circuit 100. The I-V conversion unit 40 converts the current of the detection signal of the sensor element 10 to the voltage, the detection circuit 20B detects the necessary signal component from the output of the adjustment circuit 100, and the LPF (low-pass filter) circuit 45 converts the detection signal of the detection circuit 20B to the DC signal.

The adjustment circuit 100, which has the configuration similar to that of the adjustment circuit 100 in FIG. 1A, sets the gain of an amplifier circuit 60 and the gain of a reference amplifier circuit 70 correspondingly. In setting this gain, the gain is set proportional to the power supply voltage to achieve the ratiometric characteristics in such a way that the detection sensitivity (output level) of the physical quantity sensor is increased proportional to the power supply voltage to set the variation in the power supply voltage proportional to the detection sensitivity of the physical quantity sensor.

Because an AC signal S4 is output from the I-V conversion unit 40 in the configuration shown in FIG. 1B, the adjustment circuit 100 can be configured by an analog circuit that processes the AC signal.

Next, the following describes the configuration example shown in FIG. 1A more in detail with reference to FIG. 2. In FIG. 2, 10 indicates the sensor element that comprises a driving unit 11 and a detection unit 12. 20A indicates the detection circuit that amplifies and detects a sensor element output S1 that is the output of the detection unit 12. 100 indicates the adjustment circuit, and 90 indicates a mid-point voltage generation circuit.

In addition, S2A indicates the detection output of the detection circuit 20A, and S6 indicates the physical quantity sensor output generated by converting the level of the detection output S2A, output from the detection circuit 20A, by the adjustment circuit 100. In this configuration, the circuit part of the physical quantity sensor, that is, the detection circuit 20A, the adjustment circuit 100, and a driving circuit 80, operates on the voltage Vdd (for example, 5.0V) applied externally. Vdd is the power supply voltage of the physical quantity sensor.

The sensor element 10 is a vibratory gyroscope (gyro) that is configured by placing a metal electrode on the surface of a tuning-fork-shaped piezoelectric material for detecting the angular rate. When the sensor element 10, which is vibrated and driven by the driving circuit 80, receives an angular rate during the vibration, a weak AC signal appears as the sensor element output S1.

As the driving circuit 80, a circuit is used that has the function to produce a constant driving condition for the sensor element 10, for example, the function that performs oscillation control so that the current value, obtained from a high-accuracy constant current source (not shown) not affected by a variation in the power supply voltage, becomes equal to the effective value of the excitation current of the sensor element 10. Another configuration is also possible in which a voltage regulator circuit, which outputs a constant voltage without being affected by a variation in the power supply voltage, is used in the driving circuit 80 to stabilize the excitation current of the sensor element 10 based on this constant voltage.

The detection circuit 20A is a circuit that detects and amplifies the sensor element output S1 obtained from the sensor element 10 and outputs the signal that is converted to the DC signal. The detection output S2A is output from the detection circuit 20A. The description of the configuration of the sensor element 10 and the detection circuit 20A is omitted because they are well known circuits.

The adjustment circuit 100 is a signal level conversion circuit that outputs the detection output S2A, detected and amplified by the detection circuit 20A, to a predetermined level for output, that is, adjusts the detection sensitivity of the physical quantity sensor and outputs the adjusted sensitivity externally as a physical quantity sensor output S6.

The mid-point voltage generation circuit 90 is a voltage source that outputs the voltage value that is ½ of the power supply voltage applied to the physical quantity sensor. The mid-point voltage generation circuit 90 supplies the mid-point voltage Vm (for example, 2.5V when the power supply voltage Vdd is 5.0V) that corresponds to the zero-point level when the detection circuit 20A and the amplifier circuit 60 operate.

The following describes the configuration example, shown in FIG. 1B, more in detail with reference to FIG. 3. In FIG. 3, 10 indicates a sensor element that comprises a driving unit 11 and a detection unit 12 in the same way as in FIG. 2. 40 indicates an I-V conversion circuit that converts the current of an output S1 of the sensor element 10 to a voltage, 100 indicates an adjustment circuit that level-adjusts the output level of an output S4, which is voltage-converted by the I-V conversion circuit 40, according to the power supply voltage, 20B indicates a detection circuit that detects an output S10 of the adjustment circuit 100, and 45 indicates an LPF circuit that converts the output of the detection circuit 20B to the DC signal. 90 indicates a mid-point voltage generation circuit.

S2B indicates the detection output of the detection circuit 20B, and S6 indicates an output which is generated by converting the output S2B of the detection circuit 20B to DC signal by the LPF circuit 45. S6 is a physical quantity sensor output generated by level-converting the sensor output, by detecting the output by the detection circuit 20B, and by converting the output to the DC signal by the LPF circuit 45. In this configuration, the circuit part of the physical quantity sensor, that is, the detection circuit 20B, adjustment circuit 100, and driving circuit 80, operates on the voltage Vdd (for example, 5.0V) applied externally. Vdd is the power supply voltage of the physical quantity sensor.

The sensor element 10, driving circuit 80, adjustment circuit 100, detection circuit 20B, and mid-point voltage generation circuit 90 are the same as those in the description of FIG. 2 and, therefore, the description is omitted here.

In the configuration of the physical quantity sensor of the present invention shown in FIG. 2 and FIG. 3, the adjustment circuit 100 comprises the amplifier circuit 60 that amplifies the output signal, the reference amplifier circuit 70 that sets the gain of the amplifier circuit 60, and a control circuit 50. The control circuit 50 receives the feedback signal from the reference amplifier circuit 70 and sets the gain. In setting this gain, the gain is set proportional to the power supply voltage. This setting increases the detection sensitivity (output level) of the physical quantity sensor proportional to the power supply voltage and achieves the ratiometric characteristics that make a variation in the power supply voltage proportional to the detection sensitivity of the physical quantity sensor.

The adjustment circuit 100 of the present invention, which comprises the amplifier circuit 60 that adjusts the signal level of the output signal and the reference amplifier circuit 70 that sets the gain, sets the gain via the reference amplifier circuit 70 and, at the same time, sets this gain in the amplifier circuit 60 correspondingly to suppress a variation in the gain that may be generated due to the circuit element characteristics.

In setting the gain using the reference amplifier circuit 70, variation factors other than a variation in the power supply voltage, such as a variation in the temperature, are removed by the control circuit 50 and the gain is set based only on a variation in the power supply voltage. This configuration can suppress a variation in the gain that may be generated by a variation included in the power supply voltage.

In this configuration, the physical quantity sensor of the present invention suppresses a variation in the gain caused by the circuit element characteristics and a variation in the gain caused by a variation other than that of the power supply voltage, and varies the detection sensitivity of the physical quantity sensor proportional to a variation in the power supply voltage without being affected by the characteristics such as the circuit element characteristics and the ambient temperature.

Next, the following describes the configuration of the adjustment circuit 100 with reference to FIG. 4. In the figure, 30 indicates a reference signal generation circuit, 60 indicates the amplifier circuit, 70 indicates the reference amplifier circuit, and 50 indicates the control circuit. The adjustment circuit 100 is configured on the same semiconductor chip as that of the detection circuits 20A and 20B described above.

The reference signal generation circuit 30 comprises a reference voltage source 31 that generates a first reference signal S31 and a reference resistor 32 that generates a second reference signal S32. The reference voltage source 31 outputs a fixed voltage to increase the mid-point voltage Vm to generate the first reference signal S31 that is higher than the mid-point voltage Vm. On the other hand, the reference resistor 32, connected between the power supply voltage Vdd and the mid-point voltage Vm, divides the power supply voltage Vdd and the mid-point voltage Vm to generate the reference signal S32.

The first reference signal S31, not dependent on the power supply voltage, is fixed. In contrast, the second reference signal S32, which is generated by dividing the power supply voltage Vdd and the mid-point voltage Vm, depends on the power supply voltage.

In the description below, assume that the voltage at ½ of the resistance value of the reference resistor 32 is the second reference signal S32. On the other hand, assume that the output voltage value of the first reference signal S31 of the reference voltage source 31 is 1.25V and is fixed without being affected by a variation in the power supply voltage Vdd and the ambient temperature.

The amplifier circuit 60 is an amplifier circuit that can control the gain based on the signal input to the control signal terminal C. An example of the configuration of this amplifier circuit 60 will be described later. The amplifier circuit 60, a circuit that amplifies the signal received from the sensor element 10, receives the input signal Sin and outputs the output signal Sout. The reference amplifier circuit 70, which sets the gain of the physical quantity sensor, has the same configuration as that of the amplifier circuit 60. The same signal is applied to the control signal terminal C of the reference amplifier circuit 70 and the amplifier circuit 60 in this configuration so that the gains of both amplifier circuits vary correspondingly to keep the ratio between the gains constant. The reference amplifier circuit 70 receives the first reference signal S31 as the input signal and outputs the output signal to one of the input terminals (negative input end) of the control circuit 50.

In addition, using the control circuit 50 that is an amplifier circuit, the feedback system is configured in which the gain of the reference amplifier circuit is set according to the output of the reference amplifier circuit 70. In this feedback system, the gain of the reference amplifier circuit 70 is decreased if an output S7 of the reference amplifier circuit 70 is higher than the second reference signal S32 and, conversely, the gain of the reference amplifier circuit is increased if the output S7 of the reference amplifier circuit 70 is lower than the second reference signal S32. A control signal S5, which is the feedback signal output from the control circuit 50, is input to the control signal terminal C of the amplifier circuit 60 and the reference amplifier circuit 70. This configuration always makes equal the output of the reference amplifier circuit 70 and the second reference signal S32. In this example, the control circuit 50 may be configured by a differential amplifier.

In the configuration shown in FIG. 4, the second reference signal S32 is a signal generated by dividing the mid-point voltage Vm, which is ½ of the power supply voltage Vdd, by 2 and therefore varies proportional to the power supply voltage Vdd. The other reference signal, the first reference signal S31, is a fixed voltage that does not depend on the power supply voltage Vdd.

Because the control circuit 50 operates so that the signal, generated by amplifying the first reference signal S31 by the reference amplifier circuit 70, and the second reference signal S32 become equal, the gain of the reference amplifier circuit 70 varies proportional to the power supply voltage Vdd. In addition, because the same control signal S5 is input to the control signal terminal C of the amplifier circuit 60 and the reference amplifier circuit 70, the gain of the amplifier circuit 60 and the gain of the reference amplifier circuit 70 are set correspondingly and the gain of the amplifier circuit 60 also becomes proportional to the power supply voltage Vdd.

In this example, the output voltage value of the reference voltage source 31 is set to 1.25V and the second reference signal S32 is selected so that it becomes ¼ of the power supply voltage Vdd. Therefore, when the power supply voltage Vdd is 5.0V, the second reference signal S32 becomes 1.25V which is equal to the first reference signal S31 when the mid-point voltage Vm is the reference. This causes the control circuit 50 to operate to set the gain of the reference amplifier circuit 70 to 1.0. Therefore, the gain of the amplifier circuit 60 also becomes 1.0.

Next, the following describes the operation of the physical quantity sensor of the present invention. The following describes the operation with FIG. 2 as the example.

When the power supply voltage Vdd is applied to the physical quantity sensor, the driving circuit 80 starts AC-driving the driving unit 11 of the sensor element 10 at a predetermined current value. Because the driving current of the driving circuit 80 is not affected by a variation in the power supply voltage as described above, the driving unit 11 always in the stable oscillation state.

When the angular rate is applied to the physical quantity sensor in this state, an AC signal having the amplitude according to the angular rate appears at the sensor element output S1. This sensor element output S1 is detected by the detection circuit 20A and is converted to the predetermined DC signal.

The amplifier circuit 60 operates as an amplifier circuit having a predetermined gain and outputs the angular rate signal, generated by amplifying the detection output S2A, as the sensor output S6. Because the driving condition of the sensor element 10 is always constant, the signal of the detection output S2A is not affected by the power supply voltage Vdd and the signal level becomes constant for the application of an angular rate.

However, the gain of the amplifier circuit 60 and the gain of the reference amplifier circuit 70 vary correspondingly as described above. The gains of both amplifier circuits vary proportional to the power supply voltage Vdd. So, if the power supply voltage Vdd of the physical quantity sensor is increased, the detection sensitivity of the physical quantity sensor is increased proportional to the variation. As a result, the output signal level of the sensor output S6, which is output from the amplifier circuit 60, is increased. That is, the physical quantity sensor can perform the level conversion operation in such a way the detection sensitivity has the ratiometric characteristics.

For example, even when the same angular rate is given to the physical quantity sensor, the signal level of the sensor output S6 is increased 5% when the power supply voltage Vdd is increased 5%. Conversely, when the power supply voltage Vdd of the physical quantity sensor is decreased, the signal level of the sensor output S6 is decreased proportional to the decrease in the power supply voltage Vdd.

In this example, the gain accuracy is determined by the absolute voltage value of the reference voltage source 31 and the temperature characteristics. Because extremely high accuracy trimming is made possible by the well-known voltage regulator circuit technology, the gain of the reference amplifier circuit 70, including the temperature characteristics, can be adjusted extremely accurately. In addition, forming the amplifier circuit 60 and the reference amplifier circuit 70 in the same configuration on the same semiconductor chip can minimize the relative error in the gain generated by a semiconductor fabrication error, thus allowing the gain of the reference amplifier circuit 70 to be reflected accurately on the amplifier circuit 60. Those factors make it possible to increase the accuracy of the detection sensitivity of the physical quantity sensor.

Depending upon the application, it is also possible that an inverting amplifier circuit, in which a MOS element is used as the input resistor and an ordinary resistor element is used as the feedback resistor in the same way as in the technology described in Patent Document 1, is used as the amplifier circuit 60 and the reference amplifier circuit 70. In this case, though the linearity is worse than that of a circuit where an OTA is used as will be described later, there is an advantage that the semiconductor chip can be made compact with a smaller number of circuit elements. Of course, the difference in the electrical characteristics of the MOS element and resistor elements and the fabrication errors can be canceled by the control circuit 50 and, so, the problem with the prior-art technology can be solved.

Although the amplifier circuit 60 and the reference amplifier circuit 70 in the embodiment described above are those whose gain can be varied continuously, the circuits whose gain can be varied digitally may also be used. In that case, a logic circuit having the function equivalent to that described above replaces the control circuit 50 to achieve the same effect.

Next, with reference to FIG. 5 to FIG. 9, the following describes configuration examples 60A-60D of amplifiers that constitutes the amplifier circuit 60 and the reference amplifier circuit 70. Because the configuration of the reference amplifier circuit 70 is the same as that of the amplifier circuit 60, the following describes only the amplifier circuit 60 and the description of the reference amplifier circuit 70 is omitted.

Figure 5:
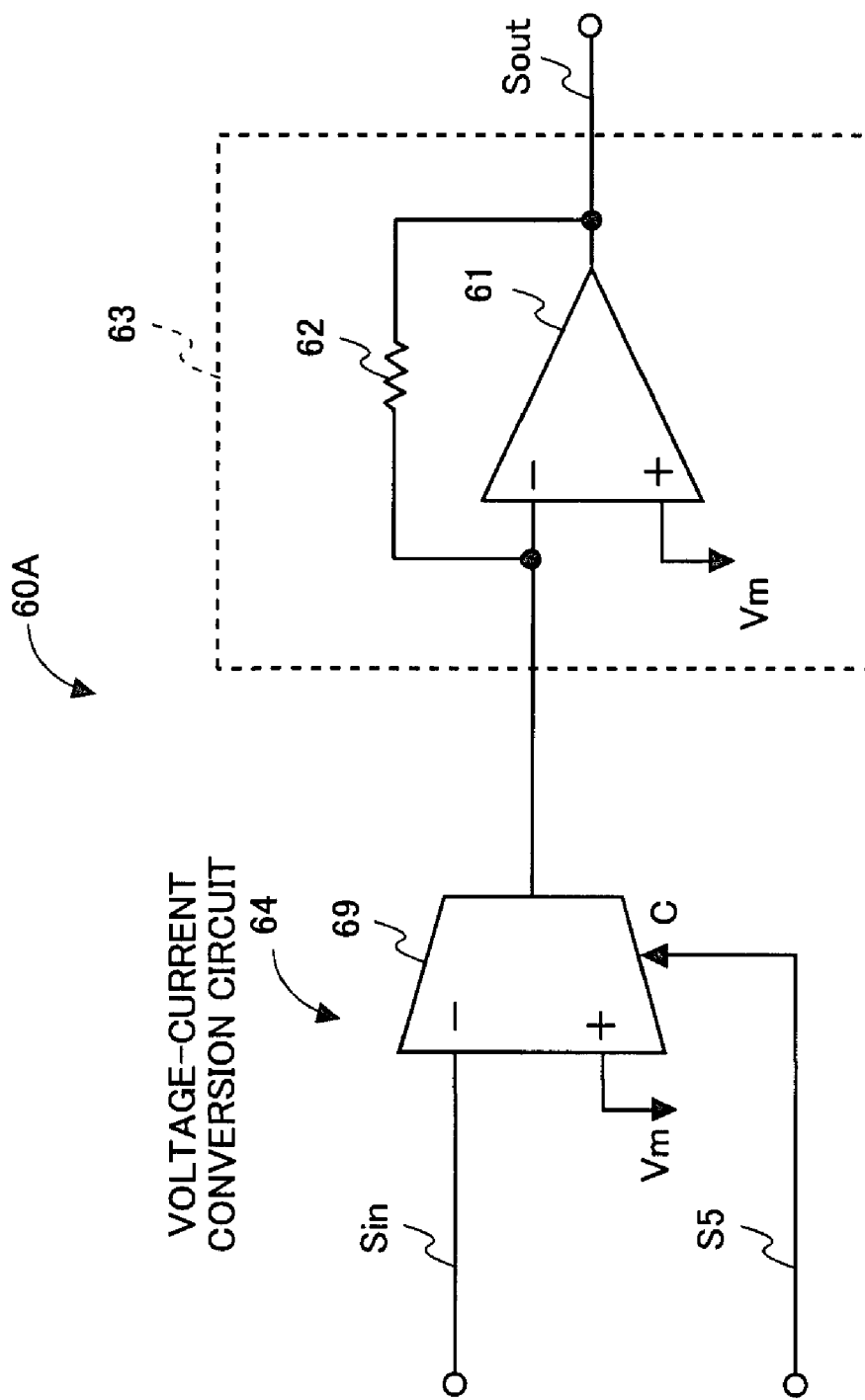
FIG. 5 is a block diagram showing the general configuration of an amplifier circuit or a reference amplifier circuit of the present invention.

The configuration example 60A of the amplifier shown in FIG. 5 is an example of the configuration in which an OTA is used. In this configuration, a current-voltage conversion circuit is connected in series to a voltage-current conversion circuit, this voltage-current conversion circuit is configured by a transconductance amplifier whose mutual conductance is variable, the mutual conductance of this transconductance amplifier is controlled by the output signal of the control circuit described above to make the voltage-to-current conversion rate variable, and the current converted by this voltage-current conversion circuit is converted to the voltage by the current-voltage conversion circuit to control the gain.

Figure 6:
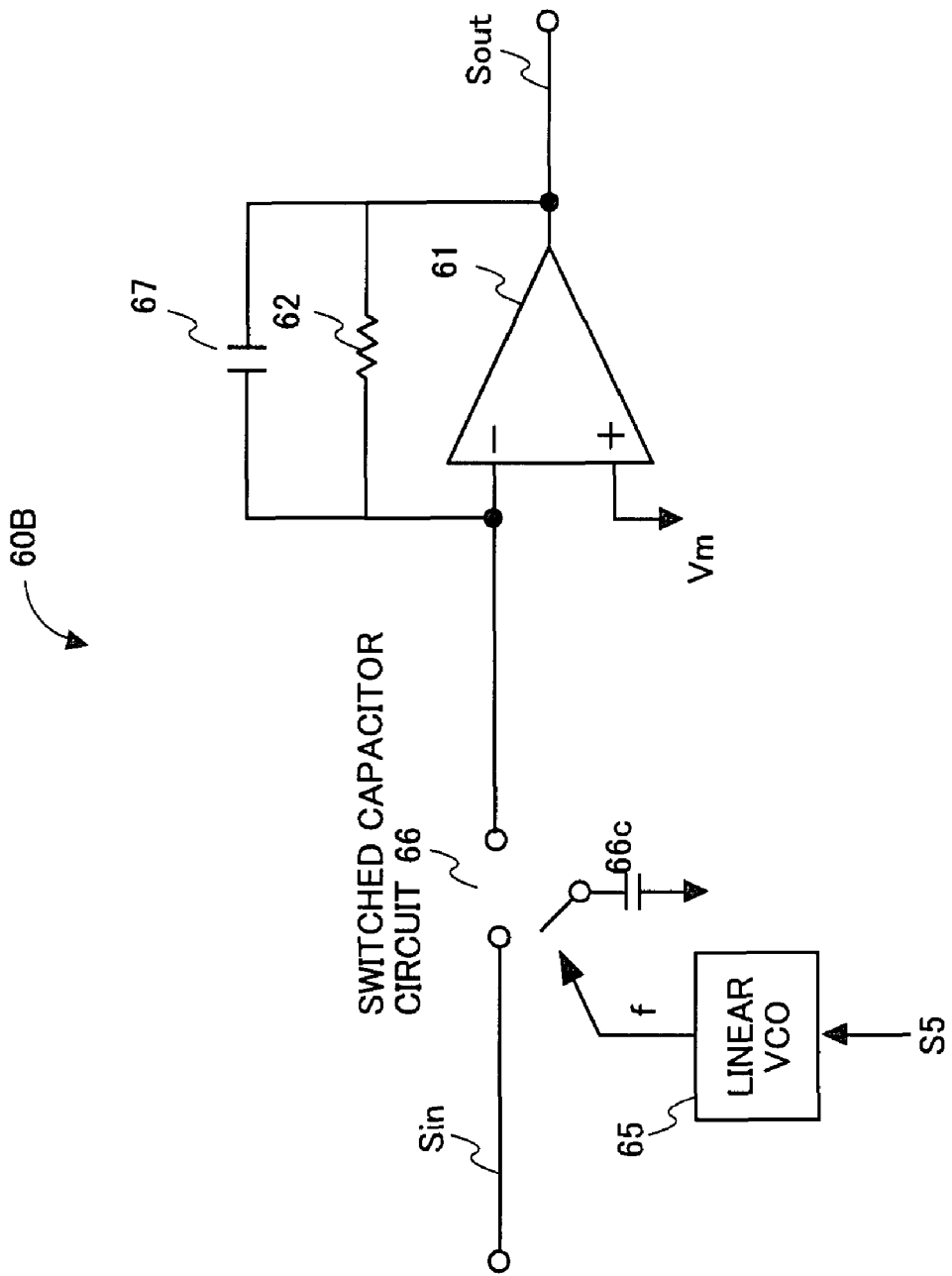
FIG. 6 is a block diagram showing the general configuration of an amplifier circuit or a reference amplifier circuit of the present invention.

In the configuration example 60B of the amplifier shown in FIG. 6, an inverting amplifier or a non-inverting amplifier is configured by an operational amplifier (OP-Amp), and the resistor elements such as the input resistor and the feedback resistor connected to this operational amplifier are configured by a variable resistor that configures an equivalent resistor that uses a switched capacitor circuit.

The input resistor or the feedback resistor or both the input resistor and the feedback resistor of this operational amplifier are configured by a switched capacitor circuit, and the switching of the switch on-off of this switched capacitor circuit is controlled by the output signal of the control circuit to make the input resistance variable and to control the gain and, thus, the gain is controlled. The input resistor is not used for a non-inverting amplifier.

In the configuration examples 60C and 60D of the amplifiers shown in FIG. 7 and FIG. 8, an inverting amplifier or a non-inverting amplifier is configured by an operational amplifier (OP-Amp), and the resistor elements such as the input resistor and the feedback resistor connected to this operational amplifier are configured by a variable resistor that configures an equivalent resistor that uses an OTA. The input resistor or the feedback resistor or both the input resistor and the feedback resistor of this operational amplifier are configured by a transconductance amplifier whose mutual conductance is variable, the mutual conductance of this transconductance amplifier is controlled by the output signal of the control circuit to make the resistance variable, and the gain is controlled by making this resistance variable. The input resistor is not used for a non-inverting amplifier.

First, the following describes the configuration example 60A of the amplifier.

As shown in FIG. 5, the amplifier circuit 60A is preferably comprised by a voltage-current conversion circuit 64 and a current-voltage conversion circuit 63. For the voltage-current conversion circuit 64, an OTA (operational transconductance amplifier) 69, which produces a high-accuracy current proportional to the potential difference between the input terminals, is used. In the OTA, the relation between the voltage across the input terminals Vin and the current Iout obtained from the output terminal can be represented as $$Iout = gm \cdot Vin$$

where gm is the proportionality factor called the mutual conductance. Especially, an OTA, whose mutual conductance gm varies according to the value of the voltage applied to the control signal terminal C, is used for the voltage-current conversion circuit 64 in this example.

In addition, the current output, obtained by the voltage-current conversion circuit 64, is converted back to the voltage signal by the current-voltage conversion circuit 63 that is configured by an OP Amp 61 and a feedback resistor 62. This configuration configures an amplifier circuit that can control the gain and provide high linearity.

Next, the following describes the configuration example 60B of the amplifier. FIG. 6 shows an example of an inverting amplifier circuit that uses an OP Amp and shows an example of the configuration in which the gain is varied by making the resistance value of the input resistor variable. The sign is opposite between the inverting amplifier circuit and the non-inverting amplifier circuit but the magnitude of the gain is determined by the input resistor and the feedback resistor connected to the operational amplifier (OP Amp) and, so, the non-inverting amplifier circuit can also be configured in the same manner. Although the gain is varied by changing the resistance value of the input resistor in this example, another configuration is also possible in which the gain is varied by changing the resistance value of the feedback resistor.

In FIG. 6, the amplifier circuit 60B is configured by an operational amplifier (OP Amp) 61, an input resistor, and a feedback resistor. The input resistor is configured by a frequency converter circuit (linear VCO) 65 that converts the voltage of the control signal S5 to the frequency and a switched capacitor circuit 66 that controls the ON/OFF switching by the clock signal with the frequency f converted by the frequency converter circuit (linear VCO) 65. On the other hand, the feedback resistor is configured by the resistor 62 and the capacitor 67 that are connected in parallel. Note that the capacitor 67 constitutes a low-pass filter.

Because the gain of the amplifier circuit 60B is determined by (−feedback resistance value Rf/Input resistance value Rs), the direction of the increase/decrease in the gain and the direction of the variation in the control signal S5 can be adjusted in the same direction by forming the input resistor using a variable resistor circuit comprising the switched capacitor circuit 66 and by changing the resistance value of this variable resistor circuit using the signal generated by converting the voltage signal of the control signal S5 to the frequency signal using the frequency converter circuit (linear VCO) 65.

For example, when the control signal S5 is increased, the resistance value of the variable resistor (switched capacitor circuit 66) is decreased to increase the gain of the amplifier circuit 60B. Conversely, when the control signal S5 is decreased, the resistance value of the variable resistor (switched capacitor circuit 66) is increased to decrease the gain of the amplifier circuit 60B.

The relation among the control signal, the frequency signal, the resistance value of the variable resistor, and the gain is that the control signal and the frequency signal are in the positive increase characteristic relation, the frequency signal and the resistance value are in the opposite increase characteristic relation, and the resistance value and the gain are in the opposite increase characteristic relation. So, the control signal and the gain are in the positive increase characteristic relation, that is, the gain is increased when the control signal is increased and the gain is decreased when the control signal is decreased. Therefore, the gain of the amplifier circuit can have the same characteristic as that of the control signal.

In the amplifier circuit 60B, the variable resistor circuit is configured by a switched capacitor circuit. The switched capacitor circuit, which moves the charge by switching the connection state of the capacitor, makes the gain variable based on the pulse modulation signal. In this example, the switched capacitor circuit 66 is configured by a switch, which has two contacts, and a capacitor.

The switched capacitor circuit is configured by the switch and a capacitor 66c. When the contact of the switch is connected to the detection circuit side, the capacitor 66c accumulates the voltage of the input signal Sin of the detection output. Next, when the switch is connected to the operational amplifier (OP Amp) 61, the charge accumulated in the capacitor 66c discharged to the inverting input terminal of the operational amplifier (OP Amp) 61.

The switch can be configured by a transfer gate (transmission gate) implemented by a MOS element, the switch contact state can be configured in such a way that the contact state is switched according to the frequency signal from the frequency converter circuit 65, and the connection state of the capacitor is switched according to the frequency signal. The switch can be fabricated in the semiconductor process in the same way as the feedback resistor 62, the capacitor 66c configuring the switched capacitor circuit 66, and the capacitor 67 connected in parallel with the feedback resistor 62 and can be configured on the same semiconductor chip. This configuration allows the elements to have the same temperature characteristics. The switched capacitor circuit 66 is connected to the inverting input terminal of the operational amplifier (OP Amp) 61, and the mid-point voltage Vm is connected to the non-inverting input terminal of the operational amplifier (OP Amp) 61.

The connection state of the capacitor 66c is switched by switching the switch between the inverting input end side and the detection circuit side in this way according to the frequency signal of the frequency converter circuit 65.

The high-speed switching operation of the switch described above causes the switched capacitor circuit 66 to perform the operation equivalent to an resistor element whose resistance value can be represented as $Re = 1/(f \cdot Cs)$, where f is the average switching frequency of the switch and Cs is the capacity of the capacitor 66c.

Because the switched capacitor circuit is equivalent to a resistor element and forms the variable resistor circuit, the gain of the amplifier circuit 60B is determined by the ratio between the feedback resistance and the input resistance. Therefore, in the configuration described above, the gain of the amplifier circuit 60B can be made variable in the same direction as that of the variation characteristic of the control signal S5 by configuring the input resistor using the switched capacitor circuit 66 and changing the equivalent resistance value of this switched capacitor circuit 66 according to the frequency of the control signal S5.

The amplifier circuit 60B, which uses the switched capacitor circuit, gives a high linearity by using a capacitor, which has a capacity not dependent on the voltage, for this capacitor. To implement a capacitor having such characteristics on a semiconductor chip, a general two-layer polysilicon process should be used to configure a capacitor whose electrodes are made of polysilicon.

Although the amplifier circuit shown in FIG. 6 has the configuration in which the operational amplifier (OP Amp) is used, the active circuit that configures the amplifier circuit is not limited to the operational amplifier (OP Amp) but some other element such as a bipolar transistor or a FET may also be used.

Although the input resistor of the operational amplifier (OP Amp) is a variable resistor in this example, another configuration is also possible in which the feedback resistor is a variable resistor or both the input resistor and the feedback resistor are variable resistors.

Next, the following describes the configuration examples 60C and 60D of the amplifier with reference to FIG. 7 and FIG. 8. The configuration examples 60C and 60D are examples of an inverting amplifier circuit in which an operational amplifier is used in the same way as in the configuration example 60B shown in FIG. 6 and are configuration examples in which the gain is varied by making the resistance value of the input resistor variable. In the configuration examples 60C and 60D, an OTA is used to configure a variable resistor.

The variable resistor can be applied to the input resistor or the feedback resistor. The configuration example shown in FIG. 7 shows an example in which the input resistor is configured by a variable resistor, and the configuration example shown in FIG. 8 shows an example in which the feedback resistor is configured by a variable resistor. The variable resistor is configured by a transconductance amplifier whose mutual conductance is variable, the resistance is made variable by controlling the mutual conductance of this transconductance amplifier by the control signal of the control circuit, and the gain is controlled by making this resistance variable.

In the input resistor in the configuration example 60C shown in FIG. 7, the output end of the transconductance amplifier 69 is connected to the input terminal side of a resistor 68 and one of the input ends (+ terminal in FIG. 7) of the transconductance amplifier 69 is connected to the output end side of the resistor 68. The mutual conductance gm of the transconductance amplifier 69 is controlled by the control signal S5.

The gain of the amplifier 60C is determined by the ratio between the input resistance value, determined by the resistor 68 and the transconductance amplifier 69, and the resistance value of the feedback resistor 62 of the OP Amp 61, and the gain is made variable by making the input resistance variable.

On the other hand, in the feedback resistor in the configuration example 60D shown in FIG. 8, the output end of the transconductance amplifier 69 is connected to the output end side of the feedback resistor 62 and one of the input ends (+ terminal side in FIG. 8) of the transconductance amplifier 69 is connected in parallel with the input end side of the feedback resistor 62. The mutual conductance gm of the transconductance amplifier 69 is controlled by the control signal S5.

The gain of the amplifier 60D is determined by the ratio between the input resistance value determined by the resistor 68, and the feedback resistance value determined by the feedback resistor 62 of the OP Amp 61 and the transconductance amplifier 69, and the gain is made variable by making the feedback resistance variable.

Note that the transconductance amplifier 69 in this case is different from that in FIG. 7 in the characteristics. The transconductance amplifier 69 in FIG. 7 uses the characteristics that the input resistance is decreased when the voltage value of the control signal S5 is high while the transconductance amplifier 69 in FIG. 8 uses the characteristics that the feedback resistance is increased when the voltage value of the control signal S5 is high.

In this configuration example, the operation can be performed in such a way that the transconductance amplifier provides a good linearity and, therefore, the detection sensitivity of the physical quantity sensor can be output with a high linearity. In addition, this configuration is suitable for processing AC signals output from the sensor element before detection.

The physical quantity sensor of the present invention controls the driving level of the driving circuit which drives the sensor element and, thereby, suppresses an output variation, generated by a voltage variation in the power supply voltage, and produces a high-accuracy output.

The driving level control of this driving circuit controls the driving level in the same direction as that of a voltage variation generated in the reference signal generation circuit to cancel the effect of the voltage variation generated in the reference signal generation circuit. To control the driving level of the sensor element in the same direction as that of a voltage variation generated in the reference signal generation circuit, the driving level of the sensor element is determined based on the first reference signal output by the reference signal generation circuit.

FIG. 9 is a diagram showing one configuration example of this driving level control. The configuration shown in FIG. 9 is similar to the circuit configuration shown in FIG. 2 described above except that the first reference signal S31, output from the reference voltage source 31 provided in the reference signal generation circuit 30, is input to the driving circuit 80 as the control signal. The driving circuit 80 determines the driving level based on the reference signal S31.

The first reference signal S31, though constant regardless of the power supply voltage, actually has its voltage slightly varied according to a variation in the power supply voltage or a variation in the ambient temperature. Therefore, once the driving level of the driving circuit 80 is determined based on the first reference signal S31, the voltage of this driving level varies according to a variation in the power supply voltage or a variation in the ambient temperature. The voltage variation in the driving level appears as a variation in the level of the detection signal S1.

Meanwhile, as described above, the gain control performed by the control circuit 50 of the present invention produces the relation that the detection signal of the sensor element 10 and the gain of the amplifier circuit 60 are increased and decreased in the opposite direction. Because the direction of the voltage variation in the driving level and the direction of the amplification characteristics are opposite when the detection signal of the sensor element 10 is signal-amplified by the amplifier circuit 60, the output signal of the sensor element and the gain of the amplifier circuit are increased and decreased in the opposite direction and, so, the effect of the voltage variation is cancelled and the detection level of the physical quantity sensor becomes constant.

For example, when the driving level is increased by a voltage variation, this increase in the driving level increases the detection signal of the sensor element 10. On the other hand, this increase in the voltage variation decreases the gain of the amplifier circuit 60 and the reference amplifier circuit 70 and so decreases the gain of the increased detection signal.

Therefore, the detection sensitivity of the physical quantity sensor, obtained from the adjustment circuit 100, becomes constant, and the output variation due to a voltage variation generated by the reference signal generation circuit is suppressed.

The physical quantity sensor in the embodiment of the present invention has been described. The present invention can provide a physical quantity sensor that is less affected by a manufacturing error or a temperature variation and that provides reliable detection sensitivity. Furthermore, the present invention can realize a physical quantity sensor whose sensor detection output provides a high linearity.

INDUSTRIAL APPLICABILITY

The present invention is applicable to the output signal level adjustment of a wide range of physical quantity sensors such as an angular rate sensor, for example, a vibratory gyroscope (gyro), and a magnetic sensor and an acceleration sensor.

The invention claimed is:

1. A physical quantity sensor comprising:
    a sensor element that converts an externally applied physical quantity to an electrical signal; and
    an adjustment circuit that adjusts a signal level of an output signal of the sensor element wherein
    said adjustment circuit comprises an amplifier circuit that amplifies the output signal of the sensor element and a reference amplifier circuit that amplifies a signal including a constant voltage of a reference voltage source which is not dependent on a power supply voltage according to a power supply voltage and sets a gain according to a power supply voltage and
    a gain of said amplifier circuit is made to correspond to the gain of said reference amplifier circuit to make a gain ratio between the gain of said amplifier circuit and the gain of said reference amplifier circuit constant for adjusting the signal level of the output signal of said sensor element.

2. The physical quantity sensor according to claim 1 wherein
    said adjustment circuit further comprises a reference signal generation circuit that outputs a second reference signal that varies according to the power supply voltage and outputs a first reference voltage source that does not vary according to the power supply voltage; and
    a control circuit that controls the gain of said reference amplifier circuit,
    said reference amplifier circuit amplifies the first reference signal,
    said control circuit controls the gain of the reference amplifier circuit so that the second reference signal becomes equal to the output of said reference amplifier circuit and controls the gain of this reference amplifier circuit for controlling the gain of said amplifier circuit according to the power supply voltage.

3. The physical quantity sensor according to claim 2 wherein
    said control circuit performs feedback control in such a way that the gain of said reference amplifier circuit is decreased if the output of said reference amplifier circuit is higher than the second reference signal and increases the gain of said reference amplifier circuit if the output of said reference amplifier circuit is lower than the second reference signal.

4. The physical quantity sensor according to claim 2, further comprising:
    a driving circuit that drives said sensor element wherein
    a driving level, at which said driving circuit drives said sensor element, is determined based on the first reference signal output by said reference signal generation circuit whereby
    an opposite increase/decrease direction relation is created between the output signal of said sensor element and the gain of said amplifier circuit to make a detection level of said physical quantity sensor constant.

5. The physical quantity sensor according to claim 1 wherein
    at least one of said amplifier circuit and said reference amplifier circuit is configured by connecting a resistor element to an operational amplifier and
    said resistor element is configured by an equivalent resistor including a transconductance amplifier whose mutual conductance is variable, the mutual conductance of this transconductance amplifier is controlled by the output signal of said control circuit to make a resistance thereof variable, and the gain is controlled by making this resistance variable.

6. The physical quantity sensor according to claim 1 wherein
    at least one of said amplifier circuit and said reference amplifier circuit is configured by connecting a resistor element to an operational amplifier and
    said resistor element is configured by an equivalent resistor including a switched capacitor circuit, and switching of a switch on/off of this switched capacitor circuit is controlled by the output signal of said control circuit to make a resistance thereof variable for controlling the gain.

7. The physical quantity sensor according to claim 1 wherein
    at least one of said amplifier circuit and said reference amplifier circuit is configured by connecting a voltage-current conversion circuit and a current-voltage conversion circuit in series in this order and
    said voltage-current conversion circuit is configured by a transconductance amplifier whose mutual conductance is variable, the mutual conductance of this transconductance amplifier is controlled by the output signal of said control circuit for making a voltage-to-current conversion rate variable, and a current converted by this voltage-current conversion circuit is converted to a voltage by said current-voltage conversion circuit for controlling the gain.

8. The physical quantity sensor according to claim 1, further comprising:
    a detection circuit between said sensor element and said adjustment circuit wherein
    said adjustment circuit adjusts a signal level of a DC output of said sensor element, said DC output being generated by said detection circuit.

9. The physical quantity sensor according to claim 1, further comprising:
    a detection circuit after said adjustment circuit wherein
    said adjustment circuit adjusts a signal level of an AC output of said sensor element and said detection circuit converts a level-adjusted output signal to a DC for output.

* * * * *